R. B. DISBROW.
PNEUMATIC MILKING APPARATUS.
APPLICATION FILED JUNE 12, 1915.
1,197,717.
Patented Sept. 12, 1916.
2 SHEETS—SHEET 1.
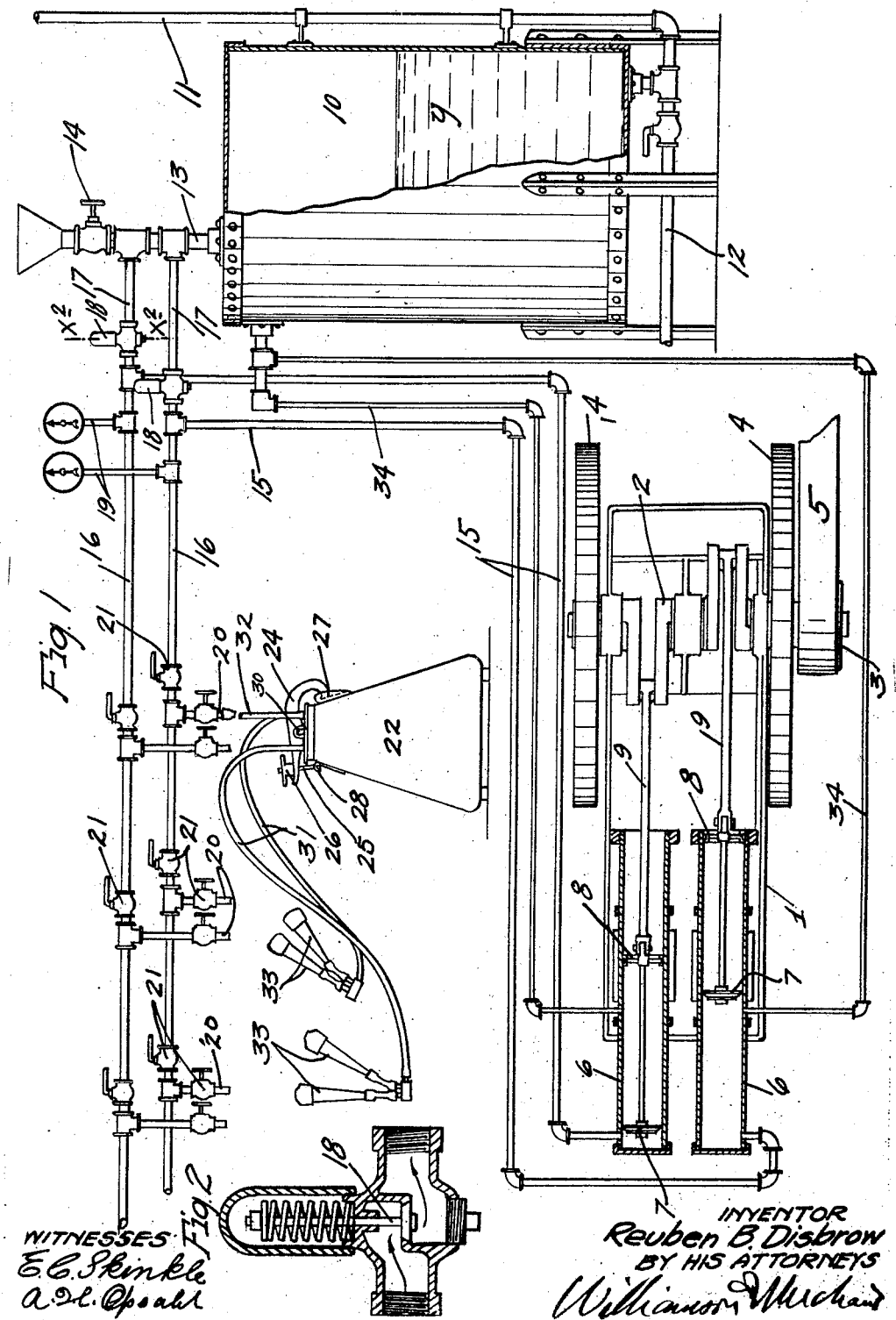
WITNESSES
E. C. Skinkle
A. H. Oppold
INVENTOR
Reuben B. Disbrow
BY HIS ATTORNEYS
Williamson & Merchant

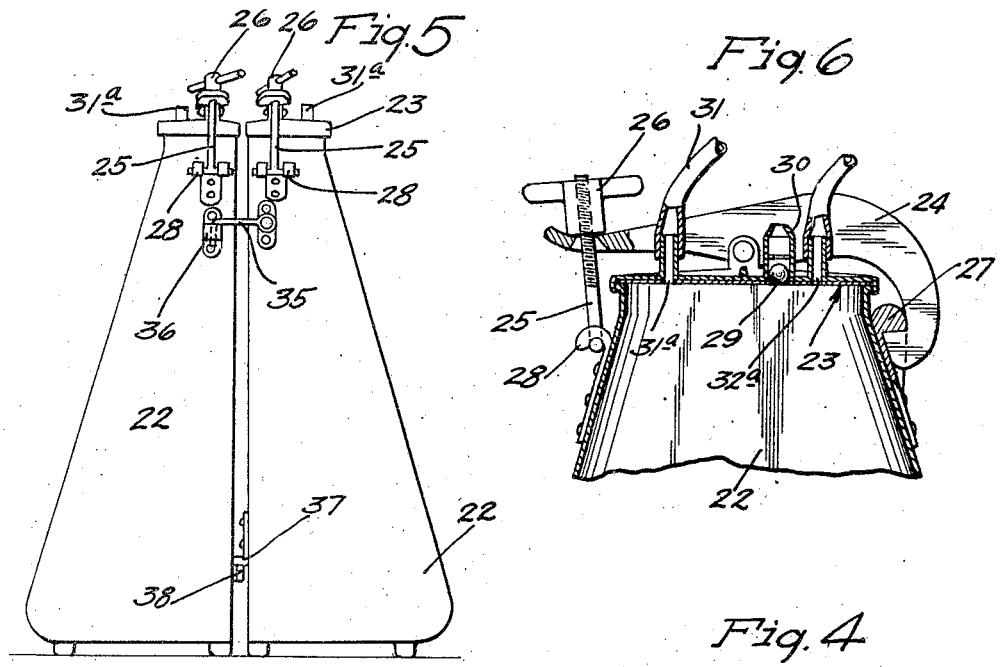
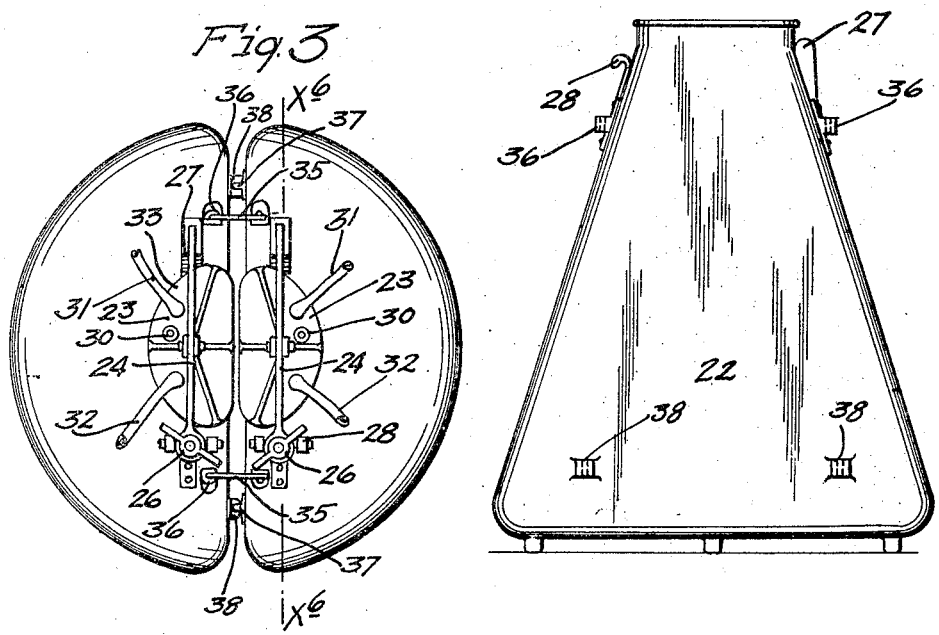

UNITED STATES PATENT OFFICE.

REUBEN B. DISBROW, OF ST. PAUL, MINNESOTA.

PNEUMATIC MILKING APPARATUS.

1,197,717.  Specification of Letters Patent.  Patented Sept. 12, 1916.

Application filed June 12, 1915.  Serial No. 33,689.

*To all whom it may concern:*

Be it known that I, REUBEN B. DISBROW, a citizen of the United States, residing at St. Paul, in the county of Hennepin and State of Minnesota, have invented certain new and useful Improvements in Pneumatic Milking Apparatus; and I do hereby declare the following to be a full, clear, and exact description of the invention, such as will enable others skilled in the art to which it appertains to make and use the same.

My invention relates to pneumatic milking apparatus, and generally stated, has for its object to simplify the construction and improve the operation thereof, with a view of obtaining better results, not only in the milking operation itself, but also the condition of the milk.

It is a well known fact that the air in a cow barn is always more or less foul, and furthermore, that there arises from the new milk itself, certain gases which, if allowed to stand, and to be absorbed in the milk as it cools, will produce objectionable qualities in the milk which not only affect its taste and the taste of the butter made from the cream thereof, but shorten the time that the milk will keep in good condition and will cause the propagation of noxious germ life in the milk.

One of the salient features of my present invention is directed to means for carrying off from the milk all foul air and gases as fast as the milk is drawn from the cows into the milk receptable. The air used for this purpose is first washed so that it is free from dirt, dust and barn gases, and then it is used to aerate the milk and to carry off therefrom the foul gases and odors.

The invention also provides improved pump mechanism for producing the required suction pulsations, and flow of air and it involves other important features and coöperative association of devices, whereby the pulsations necessary to operate several portable milking devices, may be simultaneously produced from a single pump or a single milking device may be moved from place to place or from one cow to another and operated from the single stationary or local pump mechanism.

In the accompanying drawings which illustrate the invention, like characters indicate like parts throughout the several views.

Referring to the drawings: Figure 1 is a view in elevation with some parts in vertical section illustrating the improved milking apparatus; Fig. 2 is a detail in section on the line $x^2$ $x^2$ on Fig. 1, showing a relief valve; Fig. 3 is a plan view of the two-part or duplex milk can or receptacle; Fig. 4 is an elevation looking at the said duplex can from the left toward the right, in respect to Fig. 3; Fig. 5 is an elevation looking at the can at an angle of ninety degrees from the direction in which it is shown in Fig. 4; and Fig. 6 is a vertical section taken approximately on the line $x^6$ $x^6$ on Fig. 3.

The pumping mechanism may stand as shown in Fig. 1, but preferably, it would be turned ninety degrees, and thereby set so that its crank shaft will be in a horizontal position. As preferably constructed, this pumping mechanism comprises a base 1, a crank shaft 2 journaled thereto and provided with a pulley 3 and a flat wheel 4. The crank shaft 3 is driven by a belt 5 that runs over the pulley 3. A pair of twin cylinders 6 are located in parallel arrangement side by side, and are suitably secured to the base 1. Working in each cylinder is a piston 7, the stem of which extends through the open rear end of the cylinder and is guided by a piston-like cross head 8 that also works in the said cylinder. The rear ends of the rods of the pistons 7 are connected by crank rods 9 to the cranks of the shaft 2, and here it should be noted that the said cranks are set, the one 180 degrees ahead of the other.

The numeral 10 indicates a closed air washing tank which contains water, as indicated at *y*. An air supply pipe 11 open at its outer end leads to the bottom or lower portion of the tank 10, and, as shown, is provided with a valve equipped, normally closed drain pipe extension 12. Water is adapted to be run into the tank 10 through a pipe 13, provided with a normally closed valve 14.

The outer or closed ends of the pump cylinders 6 are connected by pipes 15 to parallel line pipes 16. These line pipes 16 are connected to the air tank 10, through extension pipes 17 in which are interposed spring-closed check valves 18 shown in detail in Fig. 2. The said check valves 18 permit flow of air from the pipes 15 and line pipes 16, back into the air washing tank 10, but check a reverse flow. The numeral 19 indicates pressure gages connected to the line pipe 16. At suitable intervals, the line pipes 16 are provided with branch suction pipes 20, and adjacent to these branch pipes, the line pipes are provided with valves 21 adapted to open and close at will.

The duplex milk can or receptacle comprises two distinct milk receiving compartments or cans and preferably these two cans are separately formed elements 22 made, each of a semi-conical form and each provided with its own independent removable cover 23. The covers 23 may be held tightly in position, so as to form air-tight joints with the upper edge of the cans, by any suitable means, but as shown, they are thus held by yokes 24 and draw bolts 25 equipped with nut members 26. The yokes 24 detachably engage lugs 27 on one side of the cans and the T-shaped ends of the bolts 25 detachably engage hook lugs 28 on the other side of the cans. Each can, in its top, is provided with an independently closed check valve, and as shown, these check valves are applied to the detachable cover 23 thereof. As illustrated, the said check valves are afforded by gravity-seated balls 29 contained within tubular air discharge nipples 30 applied to the said covers. Normally, these check valves are seated and prevent air from being drawn through the nipples 30 into the respective cans, but permit a free discharge of air from the can, all as will hereinafter more fully appear.

Each can or milk receiving compartment is provided with a milk tube 31 and an air tube 32, both of which are flexible. These tubes 31 and 32, as shown, are applied to nipples 31ª and 32ª, respectively, on the cover 23. The air tubes 32 of the two cans or compartments are connected, one to each of the adjacent branch pipes 20, and hence, through the pipes 15 and 16, the said cans or milk receiving compartments are connected, one to each of the pump cylinders 6.

The free end of one of the milk tubes 31 is connected to two of the four teat cups 33 and the free end of the other milk tube is connected to the other two of the four teat cups. In Fig. 1, the two pairs of teat cups are shown as separated, but in practice, they will usually be connected in the customary way.

Directing attention again particularly to Fig. 1, it will be seen that the intermediate portions of the pump cylinders 6 have ports at the inner ends of air pipes 34 that lead from the upper portion of the air washing tank 10. The two cans 22, preferably, are detachably connected by upper fastening devices 35—36 and lower fastenings 37—38.

Operation: Let it now be assumed that the four teat cups are properly applied to the cow, that the air tubes 10 of the milk cans are applied to the branch suction tubes 20, as shown, in Fig. 1, and that the pump is in action. The two pump pistons 7 will, as is evident, be reciprocated in alternate order, so that the one will be making its suction stroke while the other is making its return stroke. The pump makes its suction stroke when the piston thereof moves from left toward the right, in respect to Fig. 1. When the piston makes this suction stroke, a suction or partial vacuum will be produced in the respective connected pipes 15, 16, 20 and corresponding milk can or receiving compartment 22. The suction produced in a milk can, as stated, will cause the milk to be drawn through one milk tube 31, and its two connected teat cups 33, and the milk thus drawn, will be delivered into the connected can. When the particular pump piston passes the inner or port end of the corresponding air pipe 34, it operates as a valve to open the same into communication with the vacuum or working end of the said cylinder, so that the partial vacuum therein will be instantly relieved by air drawn into the said cylinder through the air pipe 34 and from the air tank 10. Obviously, air can be supplied to the said tank 10 only by drawing it downward through the pipe 11, and causing the same to flow upward through the water $y$ and to thereby be thoroughly washed and relieved of all dirt or foul matter. Hence, it is the cleanest kind of fresh air that is actually drawn into the pump cylinder to relieve the same from partial vacuum. Obviously, when the said cylinder is relieved from partial vacuum, the correspondingly connected milk can will also be relieved, and through the corresponding milk tube 31, the two connected to the cups 33 will also be relieved from suction. The fresh clean air drawn into the milk can to relieve the same from partial vacuum, will, when the piston of the pump that has just been relieved from vacuum makes its return or outward stroke, be forced from the can, out past the check valve 29 and through the air discharge nipple 30. It will thus be seen that each milk can or compartment is intermittently subjected to suction or partial vacuum and then to a light air compression necessary to force out the surplus of air from the can. In this way, the proper pulsations required in milking are produced, and the can is cleared of foul air and gases. It will also, of course, be observed that the above noted operations are alternated in respect to the two pairs of teat cups, that is to say, when the one milk can is subject to suction or partial vacuum and milk is being drawn into the same, the other can is relieved from vacuum and subjected to light pressure which not only relieves the tension on the teat cups but forces the foul air out through the check valve thereof, as just noted.

In the above noted pumping action, the check valves in the tops of the milk cans and the pistons operating as valves to open and close the ports at the delivery ends of the air pipes 34, actually form part of the pumping mechanism and coöperate to produce a flow of air through the pump cylinders and the milk cans in a constant direction.

What I claim is:

1. In a pneumatic apparatus, a milk receiving can, an air washing device, a connection between said air washing device and can, and means for forcing the washed air through said can to clear the same of foul air and gases.

2. In a pneumatic milking apparatus, a milk can having a milk supply tube leading thereto, and means for producing suction pulsations in said can and for producing a flow of air therethrough to clear the same of foul air and gases.

3. In a pneumatic milking apparatus, two individual closed milk cans having milk tubes leading thereto, and means for intermittently and alternately producing suction pulsations in said cans and for alternately producing a flow of air through said cans to clear the same of foul air and gases.

4. In a pneumatic milking apparatus, a closed milk can having a check valve permitting an outflow of air therefrom, a teat-cup equipped milk tube leading to said can, and an air pump connected to said can and having a valve-controlled air intake affording a supply of air to said pump, whereby the air pumping action will produce suction pulsations in said can and will cause a flow of air therethrough to clear the same of foul air and gases.

5. In a pneumatic milking apparatus, two individual closed milk cans, each having a check valve permitting flow of air therefrom, independent teat-cup equipped milk tubes leading to said cans, and alternately acting air pumps independently connected to said milk cans and having independent air intakes.

6. In a pneumatic milking apparatus, individual closed milk cans having check valves permitting a flow of air therefrom, independent teat-cup equipped milk tubes connected to said cans, and alternately acting cylinder-and-piston air pumps independently connected to said milk cans and having air intakes arranged to be alternately opened by the respective pistons of said pumps, whereby the said cans, in alternate order, will be subject to suction pulsations and to a flow of air therethrough.

7. In a pneumatic milking apparatus, a milk receiving can having a check valve permitting an overflow of air therefrom, an air pump connected to said can, and an air washing device having connections supplying air to said pump.

8. In a pneumatic milking apparatus, a milk receiving can having a check valve permitting an overflow of air therefrom, an air pump connected to said can, an air washing device having connections supplying air to said pump, and a return connection between the air supplying device from said pump and the said air washing device, equipped with a normally closed check valve.

9. In a pneumatic milking apparatus, a milk receiving can having a check valve permitting an overflow of air therefrom, a cylinder-and-piston air pump, and an air tube connecting said cylinder to said milk can, said cylinder having an air intake passage arranged to be opened and closed by the piston of said pump.

10. In a pneumatic milking apparatus, a milk receiving can having a check valve permitting an overflow of air therefrom, a cylinder-and-piston air pump, an air tube connecting said cylinder to said milk can, said cylinder having an air intake passage arranged to be opened and closed by the piston of said pump, and an air washing device connected to the said air intake passage of said pump cylinder.

In testimony whereof I affix my signature in presence of two witnesses.

REUBEN B. DISBROW.

Witneses:
HARRY D. KILGORE,
F. D. MERCHANT.